United States Patent Office 3,282,728
Patented Nov. 1, 1966

3,282,728
PROCESS FOR SUPPRESSING ELECTROSTATIC CHARGES ON SULPHUR
Robert Lacroux, Saint-Clair-du-Rhone, and Jean-Paul Zwilling, Pau, France, assignors to Societe Nationale des Petroles d'Aquitaine, Paris, France, a society
No Drawing. Filed May 1, 1962, Ser. No. 191,412
Claims priority, application France, May 9, 1961, 861,203
9 Claims. (Cl. 117—100)

The present invention relates to a process for suppressing electrostatic charges which can be induced in metalloids and, more particularly, in sulphur; it also relates to an antistatic composition which can be applied to these substances in order to carry out the process.

The disadvantages of electrostatic charges on substances for industrial and domestic use are well known. Whereas the attraction of dust particles, for example by various plastic materials, textiles or the like, is merely inconvenient on account of the resultant soiling and staining of objects made with these materials, there are many cases where the disadvantage in question becomes serious, because of the attendant dangers of fire or explosion. This is particularly the case with electric charges generated in sulphur in powder form, bulk transport of which is greatly hindered because of frequent spontaneous combustion.

The present invention offers an efficient solution to the problem of undesirable electrostatic charges which appear on metalloids; in particular, it enables the spontaneous combustion of sulphur to be avoided and thus overcomes the danger of fire which up to the present time has attended the handling and bulk transport of this substance.

The process according to the invention consists in adding to the metalloid a small quantity of an electrolyte in the presence of a surface-active agent which is capable of considerably lowering the surface tension between the electrolyte and the metalloid.

Although various electrolytes can be used in their various solvents, the most preferable method, and the most practical in industry, consists in making use of an aqueous solution of one or more electrolytes. In this case, the simplest procedure is previously to dissolve or disperse the surface-active agent in the aqueous solution, thus forming an antistatic composition according to the invention. It is to be understood that it is possible to add the electrolyte and the surface-active agent separately to the substance to be de-electrified.

The process comprises the most uniform distribution possible of the antistatic composition over the surfaces to be treated. When the surface is smooth or the material is a powder or granules, the composition is pulverized and/or spread out, or evenly mixed with the powder or the granules.

Strong electrolytes, such as water-soluble alkali metal or alkaline earth metal salts, of strong acids, for example halogenated hydracids, sulphuric, nitric, perchloric and other acids, are very efficient and have the advantage of neutrality.

When slight alkalinity or acidity is comparable with the intended uses of the metalloid, use can be made of weak electrolytes, particularly sulphites, phosphites, acetates, tartrates or other salts of organic acids, of various inorganic bases, or even salts resulting from the combination of strong acids with weak bases, such as ammonia and amines. The use of weak electrolytes having a slight basic reaction is recommended for electrifiable substances which contain acid impurities or tend to acidify in course of time. It is thus preferable to use the acetate, propionate, tartrate, salicylate and other salt of sodium or potassium, a borate, or a di- or tri-basic phosphate, together with a suitable surface-active agent.

For the same reason, it can be useful to select the electrolyte from bases of various strengths, such as ammonia, amines, pyridine, etc., or even soda, potassium carbonate, lithium oxide, baryte or the like.

In a particularly practical embodiment of the invention, which consists in using the electrolyte in solution in water, the concentration of the solutions can vary between saturation and a great dilution, for example, of the order of 0.01 gram-molecule per liter.

However, since the antistatic composition according to the invention is applied in order to distribute an extremely thin film of electrolyte over the surface to be de-electrified, generally of the order of one to ten molecules, it is preferable in order to facilitate this distribution to use fairly dilute solutions, containing particularly 0.05 to 3 gram-molecule of electrolyte per liter. The concentration can advantageously be varied, for current practice, between 0.1 and 5% by weight.

Concentrations of the same order are suitable for solutions which may or may not be partially aqueous, like those where the solvent is constituted for example by an alcohol, a polyalcohol, ester, ether, ketone, aldehyde, or the like, preferably more or less ionic and possibly mixed with water. In fact, in accordance with the invention the electrolytes can be used in the presence of surface-active agents in solution in, for example, methyl, ethyl, propyl and butyl alcohols, ethylene glycol, polyglycols, acetone, acetyl acetone, methylethyl ketone, acetaldehyde, butyraldehyde, ethyl, propyl or butyl acetate, furfural, methyl furane, dioxane etc., taken separately or mixed together or with other solvents in water.

The surface-active agent, which is a very important constituent of the antistatic composition according to the invention, is chosen in accordance with the substances to be treated and the electrolyte used. Also, various known wetting agents can be used in order to enable the electrolyte solution to moisten the metalloid to be treated sufficiently so as to cover it with an extremely thin, uniform film. Thus, use can be made of sulfonated fatty alcohols or acids and their alkali derivatives, long-chain aliphatic amines or amides, naphthenates, choline or taurine derivatives, biliary salts, alkyl-ethoxy-phenols or the like; according to a preferred embodiment of the invention, hydrophilic, non-ionic surface-active agents are used.

Experiments have shown that, in suppressing electrostatic charges with the process of the invention, particularly good results are obtained with wetting agents which result in emulsions of the "oil-in-water" type being obtained.

Polyoxyether type wetting agents are preferred.

A particularly preferred class of surface-active agents is that in which the molecule is characterised by the presence of one or more aromatic hydroxy-substituted nuclei.

In this category, remarkable results are obtained if, in addition to the one or more hydroxy groups, the aromatic nucleus includes one or more alkoxy chains, such for example as ethoxy, propoxy, butoxy and the like.

However, the number of alkoxy groups in the aforesaid chains must be lower than that at which the surface-active agent would be converted to the "oil-in-water" type. In practice, this condition is generally satisfied if the number of carbon atoms of the alkoxy chain does not exceed 20; in the case of polyoxyether chains, this corresponds to 10 —O—$CH_2$—$CH_2$— groups, very advantageous results being obtained with 6 of these groups.

Preferably, in addition to the hydroxy groups and alkoxy chains, the wetting agents which are particularly suited to the process and antistatic compositions of the invention have their molecular weight increased by alkyl groups attached to other carbon atoms of the aromatic nucleus; this can be effected by the methyl, ethyl or propyl groups, but preferably by higher radicals, such as heptyl, octyl, nonyl, dodecyl, and the like.

Thus, in de-electrifying flowers of sulphur, nonyl-hexa-ethoxyphenol gives excellent results with electrolytes in aqueous solution or with other solvents.

Another group of surface-active agents which is very effective in the process of the invention is the group of quaternary ammonium derivatives; those agents of this group are particularly suitable in which at least one of the organic radicals connected to the pentavalent nitrogen is a long-chain aliphatic radical, i.e. having more than 5 carbon atoms. In particular, this radical can be caproyl, heptyl, capryl, lauryl, myristyl, oleyl, palmityl, stearyl etc.; it preferably contains 12 to 18 carbon atoms.

Surface-active agents comprising quaternary ammonium derivatives are known, the general formula of which can be represented by:

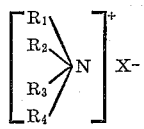

where X is an anion such as $Cl^-$, $Br^-$, $SO_4^{--}$ or the like, while $R_1$, $R_2$, $R_3$ and $R_4$ can be radicals such as methyl, ethyl, propyl, butyl, phenyl, benzyl, stearyl, etc.

One example of an agent which is particularly suitable for carrying out the invention is the substance in which $R_1$ and $R_2$ are methyl radicals, $R_3$ is a benzyl radical, while $R_4$ is a stearyl radical and X is chlorine.

Ethoxy quaternary ammonium derivatives of the type $R_3N$—$C_2H_4OH$—$Ac$ type are also suitable. In addition, good results are obtained with stearyl-amido-propyl-dimethyl-β-hydroxyethyl ammonium salts, which are known in the trade under the trademark Catanac.

Other surface-active agents which can be used in carrying out the invention are fatty amines, i.e. aliphatic amines having long-chain carbon atoms, for example, caprylamines, laurylamines, oleylamines, stearlyamines, etc., salts and/or alkoxy derivatives thereof, which it is known to use as surfactants.

The concentration of the surface-active agent in the electrolyte solution obviously varies with the activity of the agent used, the amount of electrolyte, and with the physical form and nature of the metalloid to be treated. In most instances in practice, this concentration is from 0.1 to 10 times the weight of the electrolyte, and often approaches the latter. The antistatic solution is generally a solution containing 0.5% to 15% by weight of electrolyte and 0.05 to 50% of the surface-active agent. In fact, it is unusual to have to use higher concentrations of wetting agent, which usually vary between 0.2% and 10% by weight. The most commonly used solutions contain 1% to 5% of electrolyte and 0.5% to 3% of the surface-active agent.

Since very small concentrations of electrolyte are sufficient, it is possible to dispense with the addition of an electrolyte, if the water used for dissolving the surface-active agent is fairly rich in minerals or if the surface-active agent itself contains electrolytes.

By way of example, an antistatic composition is constituted by an aqueous solution of 6% of $K_2SO_4$ and 4% of heptyl-hexa-ethoxy-phenol which is added in the ratio of 1 volume per 1000 volumes of powder to be de-electrified.

Another example is a solution containing 60% ethyl alcohol, 37% water, 1.5% dipotassium phosphate and 1.5% nonyl-octa-ethoxy-phenol.

By applying the process according to the invention, it is possible to de-electrify sulphur in pieces and/or powder form by addition of one or more of the electrolytes mentioned above, preferably having a basic salt characteristic, for example soda or potash or weak acid salts thereof and, preferably, ammonia.

The choice of the surface-active agent is of great importance. It has been found that the results leave much to be desired when using ionic wetting agents such as the salts of sulphonated fatty acids, fatty alcohols or aliphatic hydrocarbons, or the salts of nitrogenous substances such as taurine.

In contrast, de-electrifying and the avoidance of combustions are particularly well carried out when the electrolyte is used in conjunction with a non-ionic, hydrophilic wetting agent including at least one aromatic hydroxy-substituted nucleus in the molecule.

The treatment according to the invention thus has another unexpected result; the tendency for the sulphur pieces to break up, resulting in the formation of fine, inflammable particles, is considerably reduced at the end of this treatment.

It has also been proved that the treatment of the invention unexpectedly deodorizes sulphur.

The invention is illustrated by the following non-limiting examples.

*Example 1*

In order to avoid combustion of sulphur lumps, transported in bulk in railway trucks, while being loaded into the trucks, the sulphur was sprayed with an aqueous antistatic solution containing 3% by weight of $NH_3$ and 2% of nonyl-hexa-ethoxy-phenol, known under the trademark "Sunaptol DL." One kg. of the solution was used per 1000 kg. of sulphur.

Before transportation, the sulphur contained 2.5% by weight of particles passing through a sieve having an average mesh size of 0.1 mm.; when not treated in accordance with the invention, at the end of a journey of 80 kilometers, it contained approximately 8.5% of such particles; its electrostatic charges varied between 0.3 and 0.92 microcoulombs per kg. and frequent combustion occurred during the journey.

In contrast, when previously sprayed with the above-mentioned antistatic solution, the same sulphur only had electrostatic charges of the order of 0 to 0.04 microcoulombs per kg.; combustion did not occur during handling or during transportation. The proportion of fine particles, as defined above, did not exceed 3.8% after being handled in the same manner as the untreated sulphur.

Statistics have shown that untreated sulphur, transported in bulk in trucks, gave rise to one spontaneous combustion for each 1500 tons transported; after carrying out the above-described de-electrifying treatment, there was no fire for 200,000 tons transported.

*Example 2*

A treatment similar to that of Example 1 was carried out by spraying sulphur with an aqueous solution of 2% by weight of "Sunaptol DL" and 15% of potassium carbonate, i.e. mole 1.085 $K_2CO_3$ per litre of water. The result was even better than in Example 1; the static charge did not reach 0.01 microcoulomb per kg. and there was no spontaneous combustion after transporting 300,000 tons of sulphur. Moreover by using potassium carbonate, in course of time it is possible to have perfectly neutral sulphur.

*Example 3*

In the antistatic solution of Example 1, the non-ionic surface-active agent, nonyl-hexa-ethoxy-phenol, was replaced by stearyl-dimethyl-benzyl-ammonium chloride, known under the trademark "Noramium S75." The results obtained were similar to those of Example 1, although slightly less favourable; the electrostatic charge on the sulphur varied between 0 and 0.06 microcoulomb per kg.

*Example 4*

The surface-active agent of Example 1 was replaced by a surface active agent constituted by a mixture of a fatty amine and a fatty ethoxy amine, known under the name "Armoflo" of the Armour Company. The results obtained were similar to those of Example 3.

Examples 5 to 16

In this series of tests, various aqueous solutions were prepared and the resistivity of each was measured; the results of the de-electrifying of sulphur by treatment with these solutions were compared and estimated with respect to untreated sulphur. The following table shows the composition of the solutions used with and without the surface-active agent; the meanings of the abbreviations are:

DL—the surface-active agent "Sunaptol DL";
R—resistivity of the liquid in ohms. $cm^{-1}$;
A—action on the sulphur.

| No. | Solution | R | A |
|---|---|---|---|
| 5 | Distilled water | 63,000 | Nil. |
| 6 | Distilled water+2% Noramium S75 | 1,050 | Very poor. |
| 7 | Distilled water+2% LD | | Very poor. |
| 8 | Distilled water+2.8% NaCl | 28 | Very poor. |
| 9 | Distilled water+0.01% NH$_4$OH | 4,700 | Almost nil. |
| 10 | Distilled water+0.01% NH$_4$OH+2% DL | | Very poor. |
| 11 | Distilled water+0.1% NH$_4$OH | 3,710 | Almost nil. |
| 12 | Distilled water+0.1% NH$_4$OH+2% DL | 3,430 | Poor. |
| 13 | Distilled water+1% HN$_4$OH | 1,470 | Very poor. |
| 14 | Distilled water+1% NH$_4$OH+2% DL | 1,200 | Good. |
| 15 | Distilled water+15% K$_2$CO$_3$ | 10.5 | Poor. |
| 16 | Distilled water+15% K$_2$CO$_3$+2% DL | 10.5 | Very good. |

It is clear from these examples that spraying with a solution having a low resistivity, i.e. of good conductivity, is not sufficient (Examples 8 and 15); similarly, the use of surface-active agents alone (Examples 6 and 7) is also not sufficient; in order to have an effective result, it is necessary to use simultaneously a liquid of suitable conductivity and an agent for reducing the surface tension with respect to sulphur (Examples 14 and 16).

The action A is regarded as good when it results in an electrostatic charge not exceeding 0.26 microcoulmb per kg.; it is bad when the charge is greater than 0.3 microcoulomb.

Examples 17 to 34

The sulphur was treated with various aqueous solutions of electrolytes of various concentrations, containing variuos surface-active agents. 1 part by weight of the solution was used to treat 1000 parts of sulphur. The following table shows the compositions of the solutions and compares the de-electrification obtained.

| No. | Solution | Action |
|---|---|---|
| 17 | 0.5% H$_3$PO$_4$ and 0.5% octyl-tetra-ethoxy-phenol. | Poor. |
| 18 | 0.5% H$_3$PO$_4$ and 3% octyl-tetra-ethoxy-phenol. | Better. |
| 19 | 0.5% Na$_2$SO$_3$ and 1% octyl-tetra-ethoxy-phenol. | Average. |
| 20 | 5% Na$_2$SO$_3$ and 1% octyl-tetra-ethoxy-phenol. | Fairly good. |
| 21 | 5% Na$_2$SO$_3$ and 1% Sunaptol DL. | Good. |
| 22 | 2% sodium acetate and 1% Sunaptol DL. | Poorer. |
| 23 | 3% MgCl$_2$ and 1% Sunaptol DL. | Better. |
| 24 | 1% (NH$_4$)$_2$SO$_4$ and 2% sodium lauryl sulphonate. | Poor. |
| 25 | 2.5% sodium borate and 1% taurine. | Average. |
| 26 | 4% CaCl$_2$ and 3% stearylamine. | Average. |
| 27 | 2% CaCl$_2$ and 4% heptyl-hexa-ethoxy-phenol. | Good. |
| 28 | 0.3% Na$_2$HPO$_4$ and 0.6% Noramium S75. | Poor. |
| 29 | 1.3% Na$_2$HPO$_4$ and 0.6% Noramium S75. | Better. |
| 30 | 3.6% Na$_2$HPO$_4$ and 1% Noramium S75. | Even better. |
| 31 | 6% Na$_2$HPO$_4$ and 1% Noramium S75. | Good. |
| 32 | 12% Na$_2$HPO$_4$ and 1% Noramium S75. | Good. |
| 33 | 12% Na$_2$HPO$_4$ and 3% Noramium S75. | Very good. |
| 34 | 0.7% NaOH and 0.5% stearyl-amido-propyl-dimethyl-β-hydroxy-ethyl ammonium phosphate. | Good. |

What we claims is:

1. A process for treating solid sulphur particles to be transported in bulk in order to suppress electrostatic charges thereon and to reduce combustibility thereof, which comprises adding to the sulphur, in an amount of from 0.1 to 1.0% by weight thereof, an aqueous solution consisting essentially of a solvent, from 0.5 to 15% by weight of an electrolyte from the group consisting of alkali metal hydroxides, carbonates, borates and phosphates and ammonium hydroxide, and alkali metal and alkaline earth salts of strong acids, and from 0.2 to 10% by weight of a surface active agent from the group consisting of non-ionic alkyl-alkoxy-phenol, cationic quaternary ammonium derivatives, and fatty amines, and forming a thin, substantially uniform charge-suppressing coating of said electrolyte on the sulphur particles.

2. The process as defined in claim 1, in which said surface active agent is a nonionic alkyl-alkoxy-phenol-surfactant, in which the alkoxy radical has from 2 to 20 carbon atoms while the alkyl is carried by another carbon atom of the phenol and has from 1 to 12 carbon atoms.

3. The process as defined in claim 2, in which the nonionic surfactant is selected from the group consisting of heptyl-hexa-ethoxy-phenol, octyl-hexa-ethoxy-phenol and nonyl-hexa-ethoxy-phenol.

4. The process as defined in claim 2, in which said nonionic surfactant is nonyl-hexa-ethoxy-phenol.

5. The process as defined in claim 1, in which said surface active agent is a cationic quaternary ammonium salt surfactant.

6. The process as defined in claim 5, in which said cationic surfactant has the formula

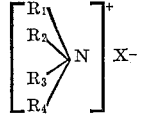

wherein X is an anion of a strong acid, $R_1$ and $R_2$ are alkyl groups having from 1 to 4 carbon atoms, $R_3$ is a benzyl group and $R_4$ is a stearyl group.

7. The process as defined in claim 5, in which the cationic surfactant is stearyl-dimethyl-benzylammonium chloride.

8. The process as defined in claim 1, in which said electrolyte is an alkali metal compound selected from the group consisting of hydroxides, carbonates, borates and phosphates, and in which said surface active agent is a nonionic alkyl-alkoxy-phenol surfactant, in which the alkoxy radical has from 2 to 20 carbon atoms while the alkyl is carried by another carbon atom of the phenol and has from 1 to 12 carbon atoms.

9. The process as defined in claim 1, in which said electrolyte is an alkali metal compound selected from the group consisting of hydroxides, carbonates, borates and phosphates, and in which said surface active agent is a cationic quaternary ammonium salt surfactant.

References Cited by the Examiner

UNITED STATES PATENTS

| | | | |
|---|---|---|---|
| 1,970,578 | 8/1934 | Schoeller et al. | 260—458 |
| 2,019,443 | 10/1935 | Christmann et al. | 252—309 X |
| 2,067,397 | 1/1937 | Henninger | 252—317 |
| 2,086,544 | 7/1937 | Dreyfus | 117—144 X |
| 2,111,552 | 3/1938 | Chambers et al. | 252—317 |
| 2,137,465 | 11/1938 | Thackston | 252—8.8 X |
| 2,156,790 | 2/1939 | Missbach | 167—20 |

(Other references on following page)

UNITED STATES PATENTS

| | | | |
|---|---|---|---|
| 2,190,922 | 2/1940 | Heath et al. | 252—317 |
| 2,348,736 | 5/1944 | Heath | 252—313 |
| 2,976,206 | 3/1961 | Baillie | 167—20 |
| 3,048,539 | 8/1962 | Kocay et al. | 252—8.9 X |
| 3,190,763 | 6/1965 | Schleede et al. | 252—8.8 |

OTHER REFERENCES

Kirk-Othmer, "Encyclopedia of Chemical Technology," vol. 13, p. 372, Interscience, New York, 1954.

Sisley, J. P., Pond Wood, P. J., "Encyclopedia of Surface-Active Agents," pp. 164, 335, 336, Chemical Publishing Co., N.Y. 1952.

WILLIAM D. MARTIN, *Primary Examiner*.

RICHARD D. NEVIUS, *Examiner*.

R. E. ZIMMERMAN, G. L. HUBBARD, M. SOFOCLEOUS, *Assistant Examiners*.